United States Patent
Young et al.

(10) Patent No.: US 10,084,556 B1
(45) Date of Patent: Sep. 25, 2018

(54) IDENTIFYING AND TRANSMITTING INVISIBLE FENCE SIGNALS WITH A MOBILE DATA TERMINAL

(71) Applicant: Hand Held Products, Inc., Fort Mill, SC (US)

(72) Inventors: Timothy Young, Clover, SC (US); John Yeschick, Baldwinsville, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 15/789,141

(22) Filed: Oct. 20, 2017

(51) Int. Cl.
| | |
|---|---|
| G08B 1/08 | (2006.01) |
| H04B 17/318 | (2015.01) |
| G08B 21/18 | (2006.01) |
| A01K 15/04 | (2006.01) |
| A01K 27/00 | (2006.01) |

(52) U.S. Cl.
CPC .......... *H04B 17/318* (2015.01); *A01K 15/04* (2013.01); *A01K 27/009* (2013.01); *G08B 21/18* (2013.01); *A01K 27/001* (2013.01)

(58) Field of Classification Search
None
See application file for complete search history.

(56) References Cited

U.S. PATENT DOCUMENTS

| | | | | |
|---|---|---|---|---|
| 4,733,633 | A | * | 3/1988 | Yarnall, Sr. ............ A01K 3/00 119/721 |
| 4,745,882 | A | * | 5/1988 | Yarnall, Sr. ............ A01K 3/00 119/721 |
| 5,121,711 | A | * | 6/1992 | Aine .................... A01K 15/023 119/502 |
| 6,019,066 | A | * | 2/2000 | Taylor ................. G11B 31/003 119/719 |
| 6,832,725 | B2 | | 12/2004 | Gardiner et al. |
| 7,128,266 | B2 | | 10/2006 | Zhu et al. |
| 7,159,783 | B2 | | 1/2007 | Walczyk et al. |
| 7,377,234 | B2 | | 5/2008 | Belcher |
| 7,413,127 | B2 | | 8/2008 | Ehrhart et al. |
| 7,726,575 | B2 | | 6/2010 | Wang et al. |
| 8,047,161 | B2 | * | 11/2011 | Moore ................ A01K 15/023 119/721 |
| 8,294,969 | B2 | | 10/2012 | Plesko |
| 8,317,105 | B2 | | 11/2012 | Kotlarsky et al. |
| 8,322,622 | B2 | | 12/2012 | Liu |
| 8,366,005 | B2 | | 2/2013 | Kotlarsky et al. |

(Continued)

FOREIGN PATENT DOCUMENTS

WO 2013163789 A1 11/2013

*Primary Examiner* — Curtis King
(74) *Attorney, Agent, or Firm* — Additon, Higgins & Pendleton, P.A.

(57) ABSTRACT

A mobile device includes a receiver for receiving radio frequency (RF) signals from a signal generating unit of an invisible fence system when a user reaches or enters a zone defining a pet restricted area. The mobile device can identify a frequency of the signals which were received from the signal generating unit. The mobile device can notify a user by providing a warning regarding the presence of the invisible fence system based upon identification of the signals. The mobile device also includes a transmitter for emitting RF signals at the identified frequency of the invisible fence system defining another zone surrounding the mobile device and the user.

18 Claims, 4 Drawing Sheets

(56) References Cited

U.S. PATENT DOCUMENTS

| | | |
|---|---|---|
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |

(56) References Cited

U.S. PATENT DOCUMENTS

| | | |
|---|---|---|
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| D757,009 S | 5/2016 | Oberpriller et al. |
| 9,342,723 B2 | 5/2016 | Liu et al. |
| 9,342,724 B2 | 5/2016 | McCloskey et al. |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,596 B1 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,414,422 B2 | 8/2016 | Belghoul et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,443,515 B1 * | 9/2016 | Boyce .................. G10L 15/22 |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,488,986 B1 | 11/2016 | Solanki |
| 9,489,782 B2 | 11/2016 | Payne et al. |
| 9,490,540 B2 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |

(56) References Cited

U.S. PATENT DOCUMENTS

| | | | |
|---|---|---|---|
| 9,558,386 B2 | 1/2017 | Yeakley | |
| 9,572,901 B2 | 2/2017 | Todeschini | |
| 9,606,581 B1 | 3/2017 | Howe et al. | |
| D783,601 S | 4/2017 | Schulte et al. | |
| D785,617 S | 5/2017 | Bidwell et al. | |
| D785,636 S | 5/2017 | Oberpriller et al. | |
| 9,646,189 B2 | 5/2017 | Lu et al. | |
| 9,646,191 B2 | 5/2017 | Unemyr et al. | |
| 9,652,648 B2 | 5/2017 | Ackley et al. | |
| 9,652,653 B2 | 5/2017 | Todeschini et al. | |
| 9,656,487 B2 | 5/2017 | Ho et al. | |
| 9,659,198 B2 | 5/2017 | Giordano et al. | |
| D790,505 S | 6/2017 | Vargo et al. | |
| D790,546 S | 6/2017 | Zhou et al. | |
| 9,680,282 B2 | 6/2017 | Hanenburg | |
| 9,693,536 B1* | 7/2017 | Dana | A01K 15/023 |
| 9,697,401 B2 | 7/2017 | Feng et al. | |
| 9,701,140 B1 | 7/2017 | Alaganchetty et al. | |
| 9,818,286 B2* | 11/2017 | Wilson | G08B 21/18 |
| 9,861,076 B2* | 1/2018 | Rochelle | A01K 15/023 |
| 2004/0070508 A1* | 4/2004 | Bach | A01K 15/023 |
| | | | 340/573.3 |
| 2005/0005874 A1* | 1/2005 | Light | A01K 15/021 |
| | | | 119/719 |
| 2005/0035865 A1* | 2/2005 | Brennan | A01K 15/021 |
| | | | 340/573.3 |
| 2005/0066912 A1* | 3/2005 | Korbitz | A01K 15/023 |
| | | | 119/721 |
| 2005/0139168 A1* | 6/2005 | Light | A01K 15/021 |
| | | | 119/721 |
| 2005/0217607 A1* | 10/2005 | Light | A01K 15/021 |
| | | | 119/721 |
| 2005/0288007 A1 | 12/2005 | Benco et al. | |
| 2007/0012260 A1* | 1/2007 | Boyd | A01K 11/00 |
| | | | 119/720 |
| 2007/0063048 A1 | 3/2007 | Havens et al. | |
| 2007/0095304 A1* | 5/2007 | Rosenberg | A01K 11/008 |
| | | | 119/720 |
| 2007/0113797 A1* | 5/2007 | Mainini | A01K 15/023 |
| | | | 119/721 |
| 2008/0141949 A1* | 6/2008 | Taylor | A01K 15/021 |
| | | | 119/712 |
| 2008/0180256 A1* | 7/2008 | Caldwell | A01K 15/021 |
| | | | 340/573.3 |
| 2009/0102668 A1* | 4/2009 | Thompson | A01K 15/023 |
| | | | 340/573.3 |
| 2009/0134221 A1 | 5/2009 | Zhu et al. | |
| 2009/0179759 A1* | 7/2009 | Koury | A01M 29/06 |
| | | | 340/557 |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2011/0169999 A1 | 7/2011 | Grunow et al. | |
| 2011/0202554 A1 | 8/2011 | Powilleit et al. | |
| 2011/0203530 A1* | 8/2011 | Groh | A01K 15/023 |
| | | | 119/721 |
| 2012/0111946 A1 | 5/2012 | Golant | |
| 2012/0168512 A1 | 7/2012 | Kotlarsky et al. | |
| 2012/0193423 A1 | 8/2012 | Samek | |
| 2012/0203647 A1 | 8/2012 | Smith | |
| 2012/0223141 A1 | 9/2012 | Good et al. | |
| 2012/0290132 A1* | 11/2012 | Kokubo | B25J 9/1666 |
| | | | 700/255 |
| 2013/0043312 A1 | 2/2013 | Van Horn | |
| 2013/0075168 A1 | 3/2013 | Amundsen et al. | |
| 2013/0092098 A1* | 4/2013 | Dutcher | A01K 15/04 |
| | | | 119/721 |
| 2013/0169441 A1* | 7/2013 | Wilson | A01M 29/10 |
| | | | 340/573.3 |
| 2013/0175341 A1 | 7/2013 | Kearney et al. | |
| 2013/0175343 A1 | 7/2013 | Good | |
| 2013/0257744 A1 | 10/2013 | Daghigh et al. | |
| 2013/0257759 A1 | 10/2013 | Daghigh | |
| 2013/0265165 A1* | 10/2013 | So | A01K 15/021 |
| | | | 340/573.3 |
| 2013/0270346 A1 | 10/2013 | Xian et al. | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0306728 A1 | 11/2013 | Thuries et al. | |
| 2013/0306731 A1 | 11/2013 | Pedraro | |
| 2013/0307964 A1 | 11/2013 | Bremer et al. | |
| 2013/0308625 A1 | 11/2013 | Park et al. | |
| 2013/0313324 A1 | 11/2013 | Koziol et al. | |
| 2013/0332524 A1 | 12/2013 | Fiala et al. | |
| 2014/0001267 A1 | 1/2014 | Giordano et al. | |
| 2014/0002828 A1 | 1/2014 | Laffargue et al. | |
| 2014/0020635 A1* | 1/2014 | Sayers | A01K 15/021 |
| | | | 119/721 |
| 2014/0025584 A1 | 1/2014 | Liu et al. | |
| 2014/0100813 A1 | 1/2014 | Showering | |
| 2014/0034734 A1 | 2/2014 | Sauerwein | |
| 2014/0039693 A1 | 2/2014 | Havens et al. | |
| 2014/0049120 A1 | 2/2014 | Kohtz et al. | |
| 2014/0049635 A1 | 2/2014 | Laffargue et al. | |
| 2014/0061306 A1 | 3/2014 | Wu et al. | |
| 2014/0063289 A1 | 3/2014 | Hussey et al. | |
| 2014/0066136 A1 | 3/2014 | Sauerwein et al. | |
| 2014/0067692 A1 | 3/2014 | Ye et al. | |
| 2014/0070005 A1 | 3/2014 | Nahill et al. | |
| 2014/0071840 A1 | 3/2014 | Venancio | |
| 2014/0074746 A1 | 3/2014 | Wang | |
| 2014/0076974 A1 | 3/2014 | Havens et al. | |
| 2014/0078342 A1 | 3/2014 | Li et al. | |
| 2014/0098792 A1 | 4/2014 | Wang et al. | |
| 2014/0100774 A1 | 4/2014 | Showering | |
| 2014/0103115 A1 | 4/2014 | Meier et al. | |
| 2014/0104413 A1 | 4/2014 | McCloskey et al. | |
| 2014/0104414 A1 | 4/2014 | McCloskey et al. | |
| 2014/0104416 A1 | 4/2014 | Giordano et al. | |
| 2014/0106725 A1 | 4/2014 | Sauerwein | |
| 2014/0108010 A1 | 4/2014 | Maltseff et al. | |
| 2014/0108402 A1 | 4/2014 | Gomez et al. | |
| 2014/0108682 A1 | 4/2014 | Caballero | |
| 2014/0110485 A1 | 4/2014 | Toa et al. | |
| 2014/0114530 A1 | 4/2014 | Fitch et al. | |
| 2014/0125853 A1 | 5/2014 | Wang | |
| 2014/0125999 A1 | 5/2014 | Longacre et al. | |
| 2014/0129378 A1 | 5/2014 | Richardson | |
| 2014/0131443 A1 | 5/2014 | Smith | |
| 2014/0131444 A1 | 5/2014 | Wang | |
| 2014/0133379 A1 | 5/2014 | Wang et al. | |
| 2014/0136208 A1 | 5/2014 | Maltseff et al. | |
| 2014/0140585 A1 | 5/2014 | Wang | |
| 2014/0152882 A1 | 6/2014 | Samek et al. | |
| 2014/0158770 A1 | 6/2014 | Sevier et al. | |
| 2014/0159869 A1 | 6/2014 | Zumsteg et al. | |
| 2014/0166755 A1 | 6/2014 | Liu et al. | |
| 2014/0166757 A1 | 6/2014 | Smith | |
| 2014/0168787 A1 | 6/2014 | Wang et al. | |
| 2014/0175165 A1 | 6/2014 | Havens et al. | |
| 2014/0191913 A1 | 7/2014 | Ge et al. | |
| 2014/0197239 A1 | 7/2014 | Havens et al. | |
| 2014/0197304 A1 | 7/2014 | Feng et al. | |
| 2014/0204268 A1 | 7/2014 | Grunow et al. | |
| 2014/0214631 A1 | 7/2014 | Hansen | |
| 2014/0217166 A1 | 8/2014 | Berthiaume et al. | |
| 2014/0217180 A1 | 8/2014 | Liu | |
| 2014/0231500 A1 | 8/2014 | Ehrhart et al. | |
| 2014/0247315 A1 | 9/2014 | Marty et al. | |
| 2014/0263493 A1 | 9/2014 | Amurgis et al. | |
| 2014/0263645 A1 | 9/2014 | Smith et al. | |
| 2014/0270196 A1 | 9/2014 | Braho et al. | |
| 2014/0270229 A1 | 9/2014 | Braho | |
| 2014/0278387 A1 | 9/2014 | DiGregorio | |
| 2014/0282210 A1 | 9/2014 | Bianconi | |
| 2014/0288933 A1 | 9/2014 | Braho et al. | |
| 2014/0297058 A1 | 10/2014 | Barker et al. | |
| 2014/0299665 A1 | 10/2014 | Barber et al. | |

(56) References Cited

U.S. PATENT DOCUMENTS

| | | | |
|---|---|---|---|
| 2014/0320347 A1* | 10/2014 | Rochelle | A01K 15/023 342/385 |
| 2014/0351317 A1 | 11/2014 | Smith et al. | |
| 2014/0362184 A1 | 12/2014 | Jovanovski et al. | |
| 2014/0363015 A1 | 12/2014 | Braho | |
| 2014/0369511 A1 | 12/2014 | Sheerin et al. | |
| 2014/0374483 A1 | 12/2014 | Lu | |
| 2014/0374485 A1 | 12/2014 | Xian et al. | |
| 2015/0001301 A1 | 1/2015 | Ouyang | |
| 2015/0009338 A1 | 1/2015 | Laffargue et al. | |
| 2015/0014416 A1 | 1/2015 | Kotlarsky et al. | |
| 2015/0021397 A1 | 1/2015 | Rueblinger et al. | |
| 2015/0028104 A1 | 1/2015 | Ma et al. | |
| 2015/0029002 A1 | 1/2015 | Yeakley et al. | |
| 2015/0032709 A1 | 1/2015 | Maloy et al. | |
| 2015/0039309 A1 | 2/2015 | Braho et al. | |
| 2015/0040378 A1 | 2/2015 | Saber et al. | |
| 2015/0049347 A1 | 2/2015 | Laffargue et al. | |
| 2015/0051992 A1 | 2/2015 | Smith | |
| 2015/0053769 A1 | 2/2015 | Thuries et al. | |
| 2015/0062366 A1 | 3/2015 | Liu et al. | |
| 2015/0063215 A1 | 3/2015 | Wang | |
| 2015/0088522 A1 | 3/2015 | Hendrickson et al. | |
| 2015/0096872 A1 | 4/2015 | Woodburn | |
| 2015/0100196 A1 | 4/2015 | Hollifield | |
| 2015/0115035 A1 | 4/2015 | Meier et al. | |
| 2015/0127791 A1 | 5/2015 | Kosecki et al. | |
| 2015/0128116 A1 | 5/2015 | Chen et al. | |
| 2015/0133047 A1 | 5/2015 | Smith et al. | |
| 2015/0134470 A1 | 5/2015 | Hejl et al. | |
| 2015/0136851 A1 | 5/2015 | Harding et al. | |
| 2015/0142492 A1 | 5/2015 | Kumar | |
| 2015/0144692 A1 | 5/2015 | Hejl | |
| 2015/0144698 A1 | 5/2015 | Teng et al. | |
| 2015/0149946 A1 | 5/2015 | Benos et al. | |
| 2015/0161429 A1 | 6/2015 | Xian | |
| 2015/0186703 A1 | 7/2015 | Chen et al. | |
| 2015/0199957 A1 | 7/2015 | Funyak et al. | |
| 2015/0210199 A1 | 7/2015 | Payne | |
| 2015/0220753 A1 | 8/2015 | Zhu et al. | |
| 2015/0254485 A1 | 9/2015 | Feng et al. | |
| 2015/0310243 A1 | 10/2015 | Ackley | |
| 2015/0310389 A1 | 10/2015 | Crimm et al. | |
| 2015/0327012 A1 | 11/2015 | Bian et al. | |
| 2016/0000042 A1* | 1/2016 | Smith | A01K 15/023 119/721 |
| 2016/0014251 A1 | 1/2016 | Hejl | |
| 2016/0040982 A1 | 2/2016 | Li et al. | |
| 2016/0042241 A1 | 2/2016 | Todeschini | |
| 2016/0057230 A1 | 2/2016 | Todeschini et al. | |
| 2016/0062473 A1 | 3/2016 | Bouchat et al. | |
| 2016/0092805 A1 | 3/2016 | Geisler et al. | |
| 2016/0101936 A1 | 4/2016 | Chamberlin | |
| 2016/0102975 A1 | 4/2016 | McCloskey et al. | |
| 2016/0104019 A1 | 4/2016 | Todeschini et al. | |
| 2016/0104274 A1 | 4/2016 | Jovanovski et al. | |
| 2016/0109219 A1 | 4/2016 | Ackley et al. | |
| 2016/0109220 A1 | 4/2016 | Laffargue | |
| 2016/0109224 A1 | 4/2016 | Thuries et al. | |
| 2016/0112631 A1 | 4/2016 | Ackley et al. | |
| 2016/0112643 A1 | 4/2016 | Laffargue et al. | |
| 2016/0117627 A1 | 4/2016 | Raj et al. | |
| 2016/0124516 A1 | 5/2016 | Schoon et al. | |
| 2016/0125217 A1 | 5/2016 | Todeschini | |
| 2016/0125342 A1 | 5/2016 | Miller et al. | |
| 2016/0133253 A1 | 5/2016 | Braho et al. | |
| 2016/0171597 A1 | 6/2016 | Todeschini | |
| 2016/0171666 A1 | 6/2016 | McCloskey | |
| 2016/0171720 A1 | 6/2016 | Todeschini | |
| 2016/0171775 A1 | 6/2016 | Todeschini et al. | |
| 2016/0171777 A1 | 6/2016 | Todeschini et al. | |
| 2016/0174674 A1 | 6/2016 | Oberpriller et al. | |
| 2016/0178479 A1 | 6/2016 | Goldsmith | |
| 2016/0178685 A1 | 6/2016 | Young et al. | |
| 2016/0178707 A1 | 6/2016 | Young et al. | |
| 2016/0179132 A1 | 6/2016 | Harr et al. | |
| 2016/0179143 A1 | 6/2016 | Bidwell et al. | |
| 2016/0179368 A1 | 6/2016 | Roeder | |
| 2016/0179378 A1 | 6/2016 | Kent et al. | |
| 2016/0180130 A1 | 6/2016 | Bremer | |
| 2016/0180133 A1 | 6/2016 | Oberpriller et al. | |
| 2016/0180136 A1 | 6/2016 | Meier et al. | |
| 2016/0180594 A1 | 6/2016 | Todeschini | |
| 2016/0180663 A1 | 6/2016 | McMahan et al. | |
| 2016/0180678 A1 | 6/2016 | Ackley et al. | |
| 2016/0180713 A1 | 6/2016 | Bernhardt et al. | |
| 2016/0185136 A1 | 6/2016 | Ng et al. | |
| 2016/0185291 A1 | 6/2016 | Chamberlin | |
| 2016/0186926 A1 | 6/2016 | Oberpriller et al. | |
| 2016/0188861 A1 | 6/2016 | Todeschini | |
| 2016/0188939 A1 | 6/2016 | Sailors et al. | |
| 2016/0188940 A1 | 6/2016 | Lu et al. | |
| 2016/0188941 A1 | 6/2016 | Todeschini et al. | |
| 2016/0188942 A1 | 6/2016 | Good et al. | |
| 2016/0188943 A1 | 6/2016 | Linwood | |
| 2016/0188944 A1 | 6/2016 | Wilz et al. | |
| 2016/0189076 A1 | 6/2016 | Mellott et al. | |
| 2016/0189087 A1 | 6/2016 | Morton et al. | |
| 2016/0189088 A1 | 6/2016 | Pecorari et al. | |
| 2016/0189092 A1 | 6/2016 | George et al. | |
| 2016/0189284 A1 | 6/2016 | Mellott et al. | |
| 2016/0189288 A1 | 6/2016 | Todeschini | |
| 2016/0189366 A1 | 6/2016 | Chamberlin et al. | |
| 2016/0189443 A1 | 6/2016 | Smith | |
| 2016/0189447 A1 | 6/2016 | Valenzuela | |
| 2016/0189489 A1 | 6/2016 | Au et al. | |
| 2016/0191684 A1 | 6/2016 | DiPiazza et al. | |
| 2016/0192051 A1 | 6/2016 | DiPiazza et al. | |
| 2016/0125873 A1 | 7/2016 | Braho et al. | |
| 2016/0202951 A1 | 7/2016 | Pike et al. | |
| 2016/0202958 A1 | 7/2016 | Zabel et al. | |
| 2016/0202959 A1 | 7/2016 | Doubleday et al. | |
| 2016/0203021 A1 | 7/2016 | Pike et al. | |
| 2016/0203429 A1 | 7/2016 | Mellott et al. | |
| 2016/0203797 A1 | 7/2016 | Pike et al. | |
| 2016/0203820 A1 | 7/2016 | Zabel et al. | |
| 2016/0204623 A1 | 7/2016 | Haggerty et al. | |
| 2016/0204636 A1 | 7/2016 | Allen et al. | |
| 2016/0204638 A1 | 7/2016 | Miraglia et al. | |
| 2016/0316190 A1 | 7/2016 | McCloskey et al. | |
| 2016/0227912 A1 | 8/2016 | Oberpriller et al. | |
| 2016/0232891 A1 | 8/2016 | Pecorari | |
| 2016/0242393 A1* | 8/2016 | Kennedy | A01K 27/001 |
| 2016/0292477 A1 | 10/2016 | Bidwell | |
| 2016/0294779 A1 | 10/2016 | Yeakley et al. | |
| 2016/0302386 A1* | 10/2016 | Zhao | G06F 1/1694 |
| 2016/0306769 A1 | 10/2016 | Kohtz et al. | |
| 2016/0314276 A1 | 10/2016 | Sewell et al. | |
| 2016/0314294 A1 | 10/2016 | Kubler et al. | |
| 2016/0323310 A1 | 11/2016 | Todeschini et al. | |
| 2016/0325677 A1 | 11/2016 | Fitch et al. | |
| 2016/0327614 A1 | 11/2016 | Young et al. | |
| 2016/0327930 A1 | 11/2016 | Charpentier et al. | |
| 2016/0328762 A1 | 11/2016 | Pape | |
| 2016/0330218 A1 | 11/2016 | Hussey et al. | |
| 2016/0343163 A1 | 11/2016 | Venkatesha et al. | |
| 2016/0343176 A1 | 11/2016 | Ackley | |
| 2016/0364914 A1 | 12/2016 | Todeschini | |
| 2016/0370220 A1 | 12/2016 | Ackley et al. | |
| 2016/0372282 A1 | 12/2016 | Bandringa | |
| 2016/0373847 A1 | 12/2016 | Vargo et al. | |
| 2016/0377414 A1 | 12/2016 | Thuries et al. | |
| 2016/0377417 A1 | 12/2016 | Jovanovski et al. | |
| 2017/0010141 A1 | 1/2017 | Ackley | |
| 2017/0010328 A1 | 1/2017 | Mullen et al. | |
| 2017/0010780 A1 | 1/2017 | Waldron et al. | |
| 2017/0013808 A1* | 1/2017 | Leavenworth | A01K 11/008 |
| 2017/0016714 A1 | 1/2017 | Laffargue et al. | |
| 2017/0018094 A1 | 1/2017 | Todeschini | |
| 2017/0046603 A1 | 2/2017 | Lee et al. | |
| 2017/0047864 A1 | 2/2017 | Stang et al. | |
| 2017/0053146 A1 | 2/2017 | Liu et al. | |
| 2017/0053147 A1 | 2/2017 | Germaine et al. | |
| 2017/0053647 A1 | 2/2017 | Nichols et al. | |

(56) References Cited

U.S. PATENT DOCUMENTS

| | | |
|---|---|---|
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0200108 A1 | 7/2017 | Au et al. |
| 2017/0200275 A1 | 7/2017 | McCloskey et al. |

* cited by examiner

IDENTIFYING AND TRANSMITTING INVISIBLE FENCE SIGNALS WITH A MOBILE DATA TERMINAL

FIELD OF THE INVENTION

The present invention relates generally to the field of mobile devices and associated methods of use. More specifically, the present invention relates to mobile devices such as data collection terminals for monitoring and/or broadcasting invisible fence signals.

BACKGROUND

Generally speaking, businesses have sought to maximize efficiency by using various data collection devices to automate data entry and related processes. Data collection devices read or obtain data from information bearing media, such as symbol indicia (e.g., one or two dimensional symbologies), a RFID instrument, a card having a magnetic strip, biometric information such as a fingerprint, etc. In the areas of logistics and inventory management, for example, the indicia or symbol reading device (e.g., barcode reader, barcode scanner, RFID reader, etc.) has greatly reduced the time and errors inherent to manual data entry.

Data collection devices including indicia readers may fall within a number of general categories such as, for example, mobile devices (e.g., handheld readers/scanners, portable data terminals (PDT), personal digital assistants (PDA), smartphones, etc.), laser engine barcode readers, and image sensor readers. PDTs, for example, generally integrate a mobile computer, one or more data transport/communication paths, and one or more data collection subsystems for capturing data from an external source (e.g., touches, keystrokes, RFID signals, images, code symbology, etc.).

Mobile data collection devices such as PDTs may be used, for example, by field service workers such as delivery personnel when performing tasks relating to delivering packages and/or other items to customers at delivery locations (e.g., for postal, courier, express, and/or parcel deliveries). For instance, items scheduled for delivery can be scanned by an indicia reader as the items are loaded onto a delivery vehicle so that identifying information (e.g., product numbers or package tracking numbers) is input into a computer and correlated (i.e., associated in memory) with delivery instructions for those items. Further examples include a PDT receiving input of a signature from a customer evidencing receipt of a package (e.g., on a touchscreen), or using the mobile terminal to take an image of a package left on the doorstep of the home of an absent addressee. In these exemplary cases, data collection devices facilitate the receipt of user input providing for quick, reliable data entry that is not susceptible to typographical errors.

Data collection devices such those used by delivery personnel are typically equipped for operating over a communications network via various paths so that relevant information can be transmitted/received in connection with user-related tasks.

When making deliveries (e.g., residential deliveries), delivery personnel will sometimes be required to exit the delivery vehicle and enter a property boundary (e.g., to obtain a signature, drop off a bulky package, etc.). A safety concern for delivery personnel when approaching a customer's residence or place of business is the potential presence of pets (e.g., dogs). Pet owners may utilize what is generally referred to as an invisible fence system for their pets, allowing the pets to roam within a non-visible bounded area around or adjacent to their residence or place of business.

Invisible fence systems typically utilize a transmitter to send a signal (e.g., a radio-frequency signal carried by an underground wire or sent wirelessly) that can be received by a specialized collar worn by the pet which is equipped for receiving the signal broadcast by the transmitter (e.g., a receiver sensitive to certain radio signals). When the collar acquires a certain signal from the transmitter, the collar can provide an alert (e.g., a warning tone) to the pet that the pet is approaching a boundary of the invisible fence. If the pet continues toward and/or crosses the boundary, the pet may receive further alerts from the collar (e.g., as the signal strength intensifies) such as a vibration or a shock (e.g., similar to a static shock delivered by electrodes). In this manner, the invisible fence system allows a pet to freely roam about a defined area with the alerts/corrections effectively maintaining the boundary as the pet learns from the corrective alerts or stimulus provided by the collar.

To better protect the safety of delivery personnel or other individuals that may need to enter into pet zones defined by an invisible fence in the normal course of their activities, it would be beneficial to provide a notification or warning regarding the presence of an invisible fence system and/or the presence of a pet wearing an invisible fence collar unit. For instance, a mobile computer or mobile data terminal carried by the individual (e.g., a PDT utilized by delivery personnel) could provide the notification or warning. As an additional safety measure, it would be advantageous for the mobile device carried by a user to provide a protection zone around the user by broadcasting signals for an invisible fence system. Current mobile devices, however, do not contain these safety-related features or similar features for better protecting individuals that may often enter into pet areas defined by an invisible fence.

Therefore, a need exists for more effective mobile devices and methods of use, including but not limited to mobile communication devices having the ability to monitor and/or broadcast invisible fence signals.

SUMMARY

Accordingly, in one aspect, the present invention embraces a method including receiving, by a mobile communication device, a plurality of radio frequency signals from a signal generating unit in a first radio frequency zone within a pet restricted area, wherein the radio frequency signals activates a pet collar unit when the pet collar unit receives the radio frequency signals; identifying, by the mobile communication device, a frequency of the radio frequency signals; and broadcasting, by the mobile communication device, a radio frequency signal at the identified frequency, defining a second radio frequency zone based on a signal range of the mobile communication device, so that the broadcasted radio frequency signal activates the pet collar unit when the pet collar unit receives the broadcasted radio frequency signal.

In an exemplary embodiment, the mobile communication device broadcasts the radio frequency signals at the identified frequency based on the pet collar unit entering the second radio frequency zone.

In another exemplary embodiment, the identifying comprises comparing the frequency of the received radio frequency signals with a pre-determined frequency value.

In yet another exemplary embodiment, the method further includes providing, by the mobile communication device, a notification to a user upon determining the radio frequency signal to be within a pre-determined range of frequency values.

In yet another exemplary embodiment, the broadcasting includes receiving an input on the mobile communication device for initiating the broadcast of the identified radio frequency signal in the second radio frequency zone.

In yet another exemplary embodiment, the method further includes generating at least one of a warning tone, mild shock, and a vibration on the pet collar unit upon the pet collar unit receiving of the broadcasted radio frequency signal.

In another aspect, the present invention embraces a method including: receiving, by a mobile communication device, a plurality of radio frequency signals from a signal generating unit within a pet restricted area, wherein the radio frequency signals from the signal generating unit activate a pet collar unit when the pet collar unit receives the radio frequency signals; identifying, by the mobile communication device, a frequency of the radio frequency signals to be within a pre-determined range of frequency values; and broadcasting, by the mobile communication device, radio frequency signals within the pre-determined range of frequency values, wherein the broadcasted radio frequency signals activate the pet collar unit when the pet collar unit receives the broadcasted radio frequency signals from the mobile communication device.

In an exemplary embodiment, the mobile communication device broadcasts the radio frequency signals based on at least one of the following conditions: (i) when a distance between the pet collar unit and the signal generating unit is greater than a distance between the pet collar unit and the mobile communication device and/or (ii) when the pet collar unit enters a second radio frequency zone, wherein the second radio frequency zone corresponds to an area within a radio frequency broadcast range of the mobile communication device.

In another exemplary embodiment, the identifying includes comparing the frequency of the received radio frequency signals with a pre-determined frequency value.

In yet another exemplary embodiment, the method includes providing, by the mobile communication device, a notification to a user upon determining the identified radio frequency signals to be within the pre-determined range of frequency values.

In yet another exemplary embodiment, the broadcasting includes receiving an input on the mobile communication device for initiating the broadcast.

In yet another exemplary embodiment, the method further includes generating at least one of, a warning tone, mild shock, and a vibration on the pet collar unit upon the pet collar unit receiving the broadcasted radio frequency signals.

In yet another aspect, the present invention embraces a system including: (1) a signal emitting unit configured to generate radio frequency signals at a first radio frequency zone within a pet-restricted area; (2) a mobile communication device communicatively coupled to the signal emitting unit, the mobile communication device including: a processing unit; a first trans-receiving unit coupled to the processing unit, the first trans-receiving unit configured to: receive the radio frequency signals generated by the signal emitting unit; identify the radio frequency signals to be within a pre-determined range of frequency values and at a pre-determined signal strength; and broadcast radio frequency signals within the predetermined range of frequency values in a second radio frequency zone, wherein the second radio frequency zone is based upon the pre-determined signal strength and corresponds to an area within a radio frequency broadcast range of the mobile communication device; and (3) a portable device communicatively coupled to at least one of the signal emitting unit and the mobile communication device, the portable device including: a second trans-receiving unit configured to receive radio frequency signals broadcast by the first trans-receiving unit when at least one of the following conditions occurs: (i) when distance between the portable device and the signal emitting unit is greater than the distance between the portable device and the mobile communication device; and/or (ii) when the portable device enters the second radio frequency zone.

In an exemplary embodiment, the portable device is a pet collar unit wearable by a pet, and the signal emitting unit is a radio frequency broadcasting beacon.

In another exemplary embodiment, the processing unit is configured to generate a notification on the mobile communication device upon the determining the radio frequency signal to be within the predetermined range of frequency values and at the pre-determined signal strength.

In yet another exemplary embodiment, the processing unit is configured to generate an alert on the mobile communication device based on determining presence of a pet within a pet-restricted area depending upon receiving of the radio frequency signal on the second trans-receiving unit.

In yet another exemplary embodiment, the mobile communication device is configured to receive an input from a user to initiate the broadcast of the identified radio frequency signals.

In yet another exemplary embodiment, the portable device is configured to generate at least one of a warning tone, mild shock, and a vibration based on receiving the broadcasted radio frequency signals on the second trans-receiving unit.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces mobile devices, systems, and related methods for identifying invisible fence systems and/or transmitting invisible fence signals to increase the safety of delivery personnel or other individuals that may enter into pet areas defined by an invisible fence.

In an exemplary embodiment, a mobile device such as a PDT receives/captures radio frequency (RF) signals from an invisible fence signal transmitter when a user carrying the device reaches a zone defining a pet restricted area. The mobile device identifies the RF signals which were received, and can notify a user regarding the presence of the invisible fence. The mobile device can also broadcast RF signals based upon the identified signals defining a protection zone surrounding the user.

Data collection devices, such as PDTs used by delivery personnel, include indicia readers which are often employed to decode indicia such as barcodes. A barcode is a machine-readable representation of information in graphic format. Traditionally, a barcode is a series of parallel bars and spaces of varying widths (e.g., a linear barcode or 1D barcode).

More recently, there has been an increase in the use of alternatives to the linear barcode. For example, matrix codes (e.g., 2D barcodes, QR Code, Aztec Code, Data Matrix, etc.) and Optical Character Recognition (OCR) have enjoyed increasing popularity. As used herein, terms such as indicia, barcode, and/or code symbol are intended in their broadest sense to include linear barcodes, matrix barcodes, and OCR-enabled labels, but are not limited to these examples.

One category of indicia reader are laser-based readers, generally including a laser diode assembly generating a laser light beam and a moving mirror for sweeping the laser light beam across a decodable symbol, whereby a signal is generated corresponding to the decodable symbol. Another category of indicia reader are image sensor-based readers, generally including multi-element image sensors such as CID, CMOS, or CCD image sensors and an imaging optic for focusing an image onto the image sensor. In the operation of an image sensor-based reader, an image of a decodable symbol is focused on an image sensor and a signal is generated corresponding to the symbol. Image sensor elements may be arrayed in a line or in a rectangular matrix or area. Area image sensors, for example, capture a digital picture and use software algorithms to find and decode one or more symbols.

Image sensor-based readers are, generally, more durable and offer additional features relative to laser engine readers. Features and functions which have been incorporated into image sensor-based readers include image processing capabilities.

Figure 1:
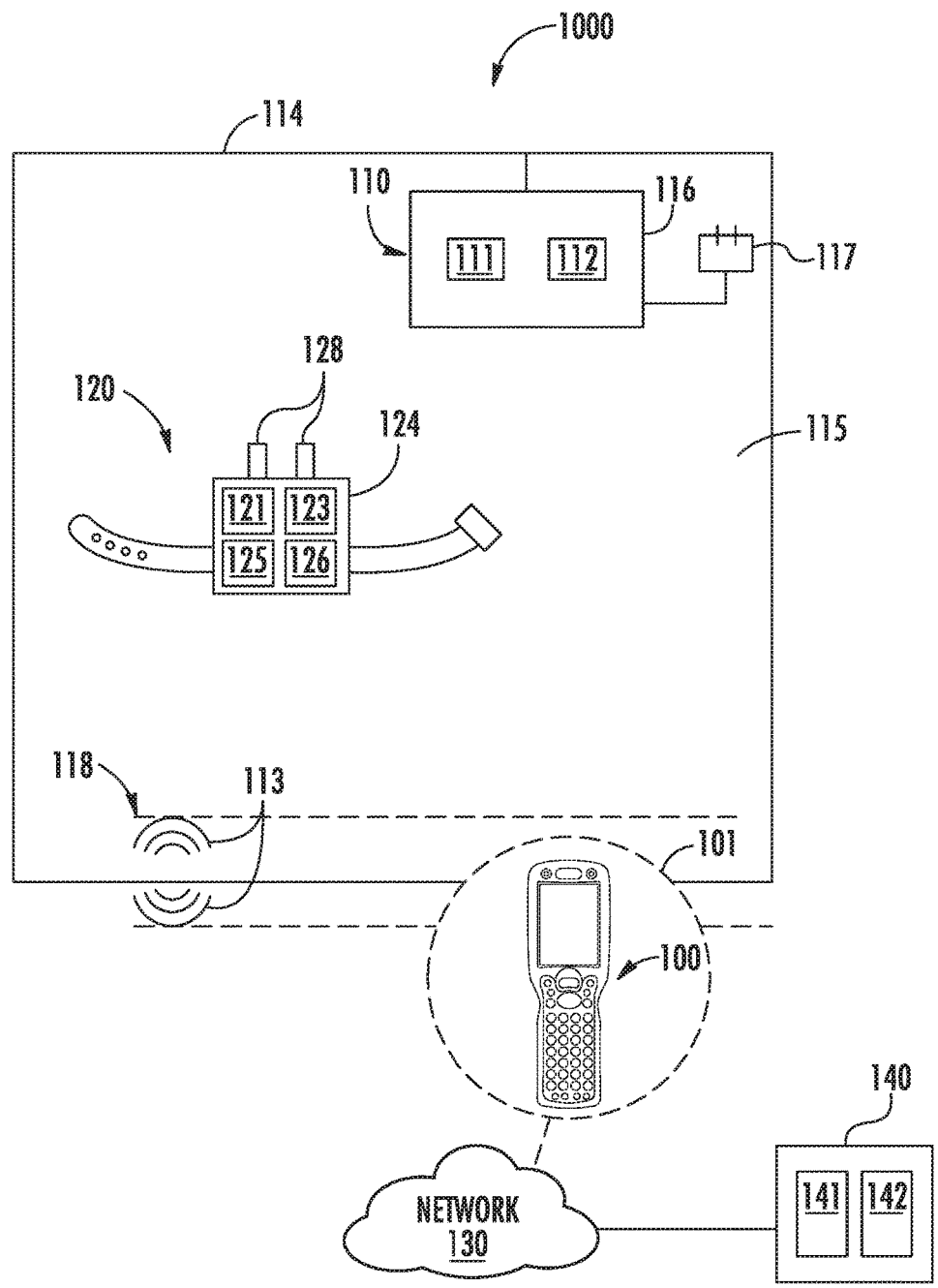
FIG. 1 schematically illustrates an operating environment according to an exemplary embodiment of the invention.

With reference to the drawings, an exemplary system 1000 illustrating an operating environment of the present invention is schematically shown in FIG. 1. The exemplary system includes a signal generating unit 110 of an invisible fence system, an associated pet collar unit 120, and a mobile communication device such as PDT 100. Although the following discussion particularly focuses on exemplary PDTs (e.g., of a type used by delivery personnel), the described embodiments can include a wide range of mobile devices.

The signal generating unit 110 of the invisible fence system has a housing 116 enclosing a transmitter 111 having associated circuitry for emitting/supplying RF signals 113 (e.g., low-level, digital AM/FM signals). For instance, a system from Invisible Fence, Inc. uses a radio carrier frequency at either 7.5 kilohertz or 10.8 kilohertz with a 30-hertz modulation frequency. The signals may be broadcast (e.g., transmitted, emitted, carried, etc.) via a wire 114 that is buried underground or located above-ground. The wire 114 acts as an antenna forming a closed loop with the signal generating unit 110 and establishes an invisible boundary or animal restricted zone/area 115.

The exemplary signal generating unit 110 has a plug 117 or other input for connection to a power supply, and may include user input mechanisms 112 (e.g., switches, dials, a keypad, touch-panel display, etc.) for adjusting various features. For example, adjusting the signal generating unit 110 to send (e.g., communicate, emit, transmit, etc.) various types, levels, and/or combinations of signals to the pet collar unit 120. The adjustable features may include: providing a tone or audible warning only; providing an audio warning followed by a vibration; providing an audio warning followed by an electric shock stimulation; adjusting the level of the tone, the vibration, and/or the electric shock (e.g., increasing the sound or intensity between various levels such as levels 1-10); changing the signal frequency (e.g., to avoid interference); and/or adjusting the area range/distance of the signal zone 118. Similar adjustment features could alternatively be provided through the pet collar unit 120 (e.g., adjusting a programmed response to receiving/detecting certain signal).

The exemplary pet collar unit 120 includes a receiver 121 having electronic circuitry at least partially contained in a housing 124. The pet collar unit 120 may include adjustment mechanisms (e.g., straps, a clasp, buckle, hook and loop fabric, etc.) so that the collar unit 120 can be worn on an animal's neck. When the pet or animal wearing the collar unit 120 reaches the boundary area 115 formed by the signals 113, the receiver 120 receives/detects the signals and applies the appropriate alert. The receiver 121 may include one or more antenna for accurately detecting the signals 113, and may filter out frequencies outside of a specified range (e.g., signal noise).

The pet collar unit 120 includes mechanisms for delivering pet alerts such as: a speaker or other sound generating unit 125, a vibration generator 126 for producing mechanical vibrations, and electrodes 128 to deliver a shock similar to a static shock. Additionally, the pet collar unit 120 includes a power source 123 such as a replaceable or rechargeable battery enclosed within the housing 124.

In other potential invisible fence system configurations (not explicitly shown), the signal generating unit 110 and/or the pet collar unit 120 may include components for wirelessly emitting and receiving signals for establishing an invisible boundary (e.g., a transceiver that can both transmit and receive radio communications). For example, the signal generating unit 110 may generate an adjustable pet restricted zone forming a concentric circle surrounding the signal generating unit 110, and/or may operate via a number of wireless beacons for establishing the pet boundary area (e.g., a number of wireless beacons positioned on posts). In a wireless system configuration, the signal generating unit 110 may be in electronic communication with the pet receiver unit 120, for example, communicating one signal for tracking the pet's location (e.g., a ranging signal) and sending another signal for triggering alerts to the collar unit when the pet approaches or crosses the boundary area. Invisible fence systems may also incorporate GPS technology for tracking the pet's position and/or for establishing an invisible boundary for communicating/transmitting appropriate signals to the pet collar unit.

Although features relating to certain invisible fence systems are described herein, the present invention is not limited to any particular system arrangement for an invisible fence (e.g., the types described above). Various features relating to the devices, systems, and associated methods disclosed herein may be applied to any number of invisible fence systems.

Before describing PDT 100 and the additional features of the exemplary system 1000 as illustrated in FIG. 1, certain exemplary features of a PDT which may be used in the present system will be described with reference to the embodiments depicted in FIGS. 2 and 3.

Figure 2:
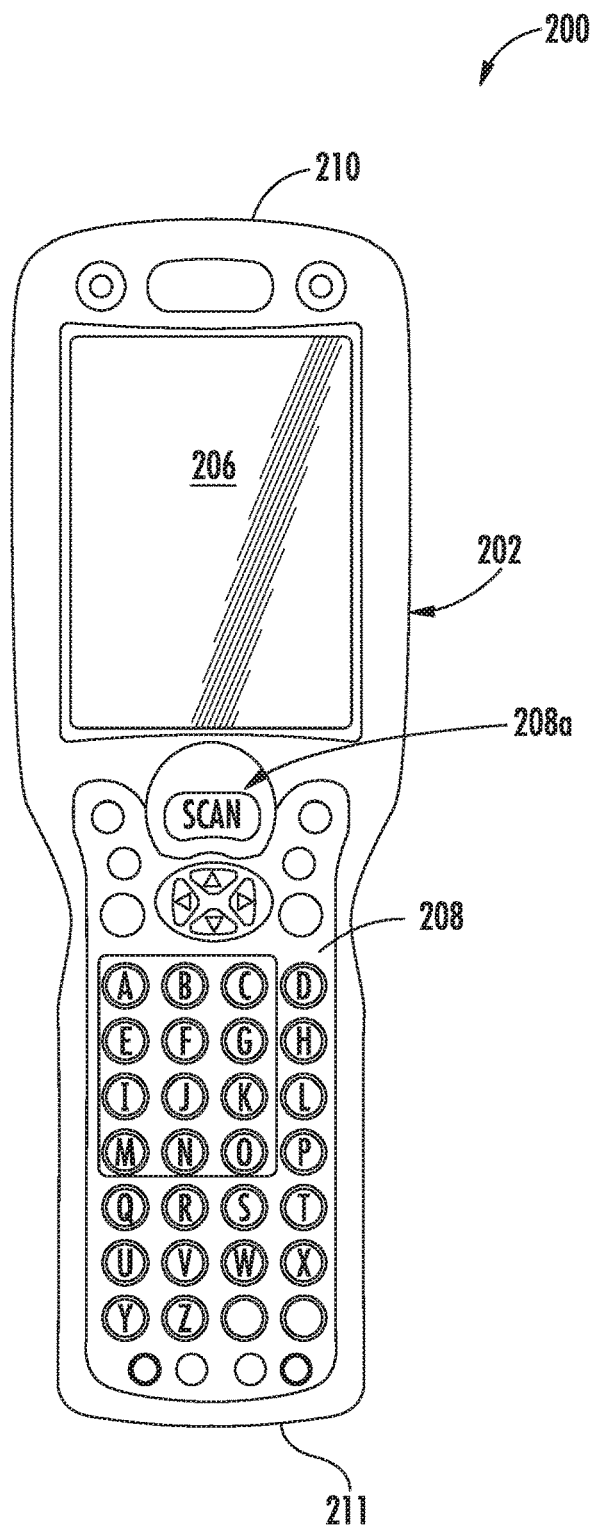
FIG. 2 is a front perspective view illustrating a form factor for a data collection device according to an exemplary embodiment of the invention.

FIG. 2 illustrates an exemplary form factor for a PDT 200 which may be utilized by delivery personnel in connection with package deliveries. Although delivery personnel and exemplary PDTs are generally discussed herein, the present invention is not limited in this regard. The applicable operating principles described apply to protecting any individuals that may enter into pet areas defined by an invisible fence and may be employed through a wide range of mobile devices (e.g., different data collection or mobile communication devices).

As shown in FIG. 2, the PDT 200 has a housing 202 for supporting a variety of components including: a battery (not explicitly shown); a touch screen 206 generally comprising a LCD screen and a touch sensitive panel; a keypad 208 which includes a scan button 208a; an indicia reader (not explicitly shown); and a data/charging port (also not explicitly shown). The indicia reader may include, for example, one or more of an image-sensor based engine, a laser engine, or an RFID engine. The indicia reader is generally located near a top end 210 of the PDT 200. The data/charging port typically comprises a mechanical interface with one set of pins or pads for transmitting and receiving data (typically via a serial interface standard such as USB or RS-232) and a second set of pins or pads for receiving power for operating the device and/or charging the battery. The data charging port is generally located near a bottom end 211 of the PDT 200.

In use, a user presses the scan key 208a to initiate data capture via the indicia reader. The captured data is analyzed (e.g., decoded to identify the information represented), stored, and may be displayed on the touch screen 206. Processing of the captured information may take place on the PDT 100 and/or an external data processing resource to which the data is transmitted (e.g., a host system).

Figure 3:
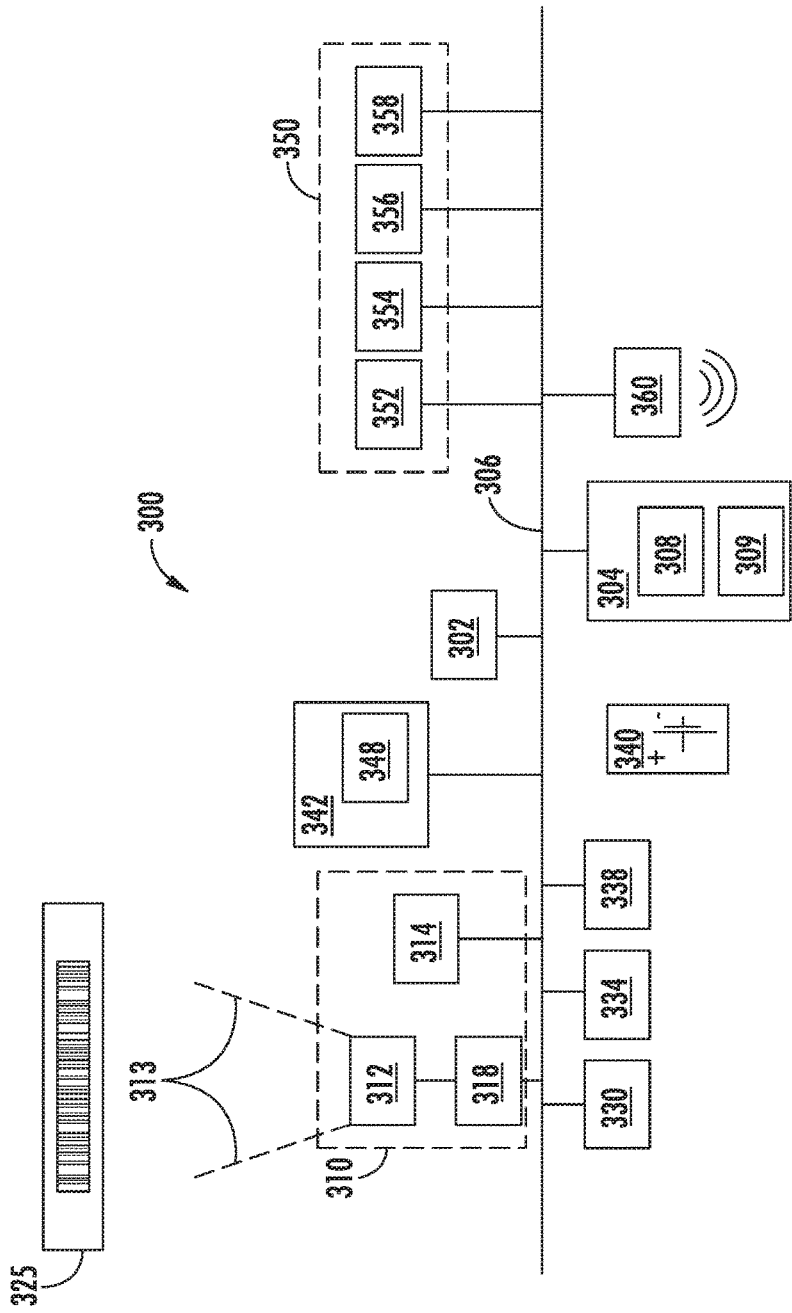
FIG. 3 schematically illustrates a data collection device according to an exemplary embodiment of the invention.

FIG. 3 is a block diagram of PDT 300 according to an exemplary embodiment of the invention. The terminal 300 may include a central processing unit (CPU) 302 (e.g., an embedded processor, general purpose microprocessor, or custom-designed system) and a computer readable medium 304 coupled to a primary system bus 306. The system bus 306 facilitates communication between the CPU 302 and the various sub-components of the system. The system bus 306 may include additional ports or busses (not explicitly shown).

Overall operation of the CPU 302 is controlled by software or firmware (typically referred to as an operating system) stored in one or more memory locations. Examples of suitable operating systems for the PDT 300 include graphical user interfaces such as WINDOWS MOBILE®, WINDOWS® CE, WINDOWS® XP, LINUX, PALM®, and OSX operating systems.

Computer readable medium 304 can be a computer readable signal medium or a computer readable storage medium. A computer readable storage medium can be, but is not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a hard disk, a random access memory (RAM), a read-only memory (ROM), an erasable programmable read-only memory (EPROM or Flash memory), an optical storage device, a magnetic storage device, or any suitable combination of the foregoing. In this case, a computer readable storage medium may be any tangible medium that can contain, or store a program for use by or in connection with an instruction execution system, apparatus, or device.

PDT 300 can include various interface circuits (not explicitly shown) for coupling various peripheral devices to system bus 306 for communication with a processor provided by CPU 302. A variety of secondary processors may also be provided to perform associated general and application specific functions (not explicitly shown).

Terminal 300 can include, for example, a display 330 (e.g., LCD), a touch sensitive panel 334, and a keyboard 338 coupled to system bus 306. The combination of the display 330 and the touch sensitive panel 334 is often referred to as a touch screen. PDT 100 can also include a battery 340.

In addition to the touch panel 334 and keyboard 338, a variety of data collection subsystems 310 may be integrated into the PDT 300. In the example shown in FIG. 3, two such systems are illustrated: an image-sensor based indicia-capturing system 312 and an RFID reader unit 314. The data acquisition subsystems 310 may be controlled with either the main CPU 302 or a secondary processor. The PDT 300 may be configured to activate a data collection subsystem based on the actuation of a key on the keypad 338 or a touch on the touch panel 334.

The indicia-capturing system 312 acquires information about indicia positioned within its field of view 313. The indicia-capturing system 312 may be manipulated to reposition the field of view 313 to include an object 325 bearing an indicium.

An indicia-decoding module 318 is configured to decode indicia information (e.g., electrical signal or digital image) acquired by the indicia-capturing system 312. Although the PDT 300 has been described as including an indicia-decoding module 318 as shown, this is only by way of example. In other embodiments, the PDT 300 may include an indicia-capturing system 312 and transmit the acquired optical information for processing or decoding at an external host or similar system.

In addition to having a decode mode of operation, the indicia-capturing system 312 may also be configured for an image capture mode of operation. In an image capture mode of operation, an electronic image representation is captured without attempting a decode. It is also possible to capture an image including code symbology and then decode the symbology, with or without making use of the non-coded area of the captured image. The captured electronic image representation may be, for example, (i) stored into a designated memory location of the memory 304, (ii) transmitted to an external device, or (iii) displayed on the display 330. This mode may be used, for example, by a delivery driver to capture an image of a signature or damage to a package.

The PDT 300 can include a number of communication links or paths 350. In general, such communications paths are either wired or wireless (e.g., ZigBee, BLUETOOTH, Wi-Fi, etc.) and may either be integrated with the CPU processor 302 or implemented as one or more separate modules (not explicitly shown). In this case, the PDT 300 includes an 802.11 communication link 352, an IR communication link 354, a Bluetooth communication link 356, and a cellular communication link 358 for communication with a cellular network such as a network in accordance with the Global System for Mobile Communications (GSM) network.

The PDT 300 also includes a signal transceiver unit 342 (i.e., a communication module or trans-receiving unit) having components for receiving and transmitting invisible fence signals (e.g., a combined radio transmitter/emitter and receiver). The signal transceiver unit 342 includes antenna 348 to capture invisible fence signals (e.g., RF signals). The signals may be converted using analog-to-digital converters (ADCs) (e.g., a direct conversion receiver) for processing via CPU 302 or via a separate processing module associated with the transceiver unit 342. Antenna 348 may include one or more small antennas integrated into the PDT 300 or removably attached.

The CPU 302 can process the signals using software (e.g., a software-defined radio (SDR) program) stored in memory (e.g., computer readable medium 304) which is specific to the applicable signal transceiver unit 342 hardware. In this way, the PDT 300 can operate as a scanner for signals generated by invisible fence systems; for example, scanning a low frequency RF signal range (e.g., 0-30 kilohertz) given that low frequency RF signals are used with certain invisible fence systems.

Although the exemplary PDT 300 utilizes computing components to perform RF capturing functions (e.g., acting as a software defined radio) that may traditionally be carried out by radio hardware components such as modulators, demodulators, and tuners, the PDT 300 could alternatively employ hardware-based solutions.

Various types of data or information relating to invisible fence systems (e.g., operating signal frequency ranges, modulation frequencies, signal strength requirements, available communication pathways, manufacturer information, model numbers, regulatory (FCC) information, etc.) can be stored in a database system 308 on computer readable medium 304, and/or maintained in a central database by a host in communication with PDT 300. The data could notably include a record of radio carrier frequencies for various fence systems, and also related systems functionality for communicating/sending different types, levels, and sequences of signals/alerts to a collar unit (e.g., a tone or audible warning, vibration, or electric shock stimulation). Thus, relevant predetermined information for invisible fence systems is registered and maintained in a database 308.

The PDT 300 can include signal program software 309 (e.g. computer program code) within memory 304. The signal program 309 can, for example, be configured to identify the presence and/or other features of an invisible fence system by comparing signals received via antenna 348 to information within the database 308. Applicable program functions (e.g., for signal program 309) can include program instructions written in any combination of one or more programming languages (e.g. an object oriented programming language such as Java, Smalltalk, C++ or the like, conventional procedural programming languages, such as the "C" programming language, low-level programming languages, such as assembly language, or other high- or low-level programming languages).

The exemplary PDT 300 can include an audio indicator 360 having a sound source (e.g., a speaker, beeper, etc.) for providing an audio notification to a user relating to an identified invisible fence system and/or detection of a pet wearing a collar unit (e.g., when the pet collar unit can both transmit and receive signals). The PDT 300 could also provide visual notifications to a user via the display 330 and/or vibratory notifications via a vibration generator (not explicitly shown).

The signal program 309 (e.g., computer program product embodied on computer readable medium 304) can also configure PDT 300 for broadcasting a signal within a relevant frequency range for the identified invisible fence system via the signal transceiver unit or communication module 342 (e.g. at a radio carrier frequency of 7.5 kilohertz or 10.8 kilohertz with a 30-hertz modulation frequency). These features are further described below.

Referring back to FIG. 1, PDT 100 may be of a form factor as shown in FIG. 2, and include features as described with reference to FIG. 3 (e.g., transceiver 342 and its related functionality for communicating with an invisible fence system). As shown in FIG. 1, when a delivery driver or other user reaches a zone defining a pet restricted area 115, the PDT 100 can capture invisible fence signals 113 (e.g., via antenna 348) transmitted by the signal generating unit 110.

The PDT 100 can identify a frequency and/or other features (e.g., signal strength) based on detected signals 113 received from the invisible fence system. Signal program 309, for example, can compare the signals with predetermined values and/or ranges of values (e.g., stored in database 308). After identifying the invisible fence system based upon frequency and/or other information for the RF signals 113 which were captured, the PDT 100 can be configured to provide a user notification such as a sound, a visual alert, or vibration indicating the presence of the invisible fence system.

The PDT 100 can also be configured (e.g., via signal program 309 functionality) to broadcast/communicate signals from the signal transceiver unit 342 based upon the invisible fence system signals which were identified (e.g., the identified carrier frequency, signal strength, etc.) for generating an appropriate alert when received by the pet collar unit 120. In this regard, the PDT 100 defines a protection zone 101 surrounding the user/PDT in which it can transmits various types, sequences, and levels of signals/alerts to the pet collar unit 120 (e.g., a tone or audible warning, a vibration, and/or a electrostatic shock). In this case, the protection zone 101 performs similar to the pet restricted area 115 described above.

A transmission range or size of the protection zone 101 can be controlled by CPU 302 and signal program 309 based upon the hardware capabilities of the signal transceiver unit 342. The protection zone 101 may be adjustable, for example, based on user input to the PDT 100 or by a system administrator (e.g., adjusting the zone 101 from a radius of 0-5 ft, or more based upon hardware capacity). The protection zone 101 may be activated in various ways, including but not limited to: automatically upon identifying an invisible fence; upon receipt of user input (e.g., pressing a button on the PDT 100), and/or upon identifying the presence of a pet collar unit (e.g., via electronic communication). Relatedly, the PDT 100 may include override functionality such that a user could turn off the protection zone 101 broadcast (e.g., where the pet is close to a package recipient and a delivery person wants to hand a package to the recipient or obtain a signature). When available for the relevant invisible fence system encountered, the type, sequence, and/or level of the pet alert signal for the protection zone 101 can be controlled and appropriately set (e.g., automatically or via user adjustment).

As shown in FIG. 1, the PDT 100 may be in communication with a host 140 via a network 130. The host may include a network interface 141 and a host computer 142 for communicating via the network 130. The network 130 can be a wide-area network (WAN) having components spread out over various locations, and may be part of the Internet. The PDT 100 may be one of a number of mobile devices interacting with host 140 via network 130 (e.g., an organizational fleet of deployed devices).

Through the network 130 and host 140, a manufacturer/supplier or system administrator of PDT 100 and other networked devices can provide and/or manage implementation of the safety-related features of the present invention. For instance, software functions can be loaded onto the networked devices (e.g., signal program 309) using any appropriate medium (e.g., wirelessly or through a wired connection). Further, through network communication 130, locations and other features of specific invisible fence systems can be accumulated into a central database (e.g. similar to database 308 maintained by a host server) as delivery personnel or other device users come into contact with invisible fence systems over the course of their activities.

Figure 4:
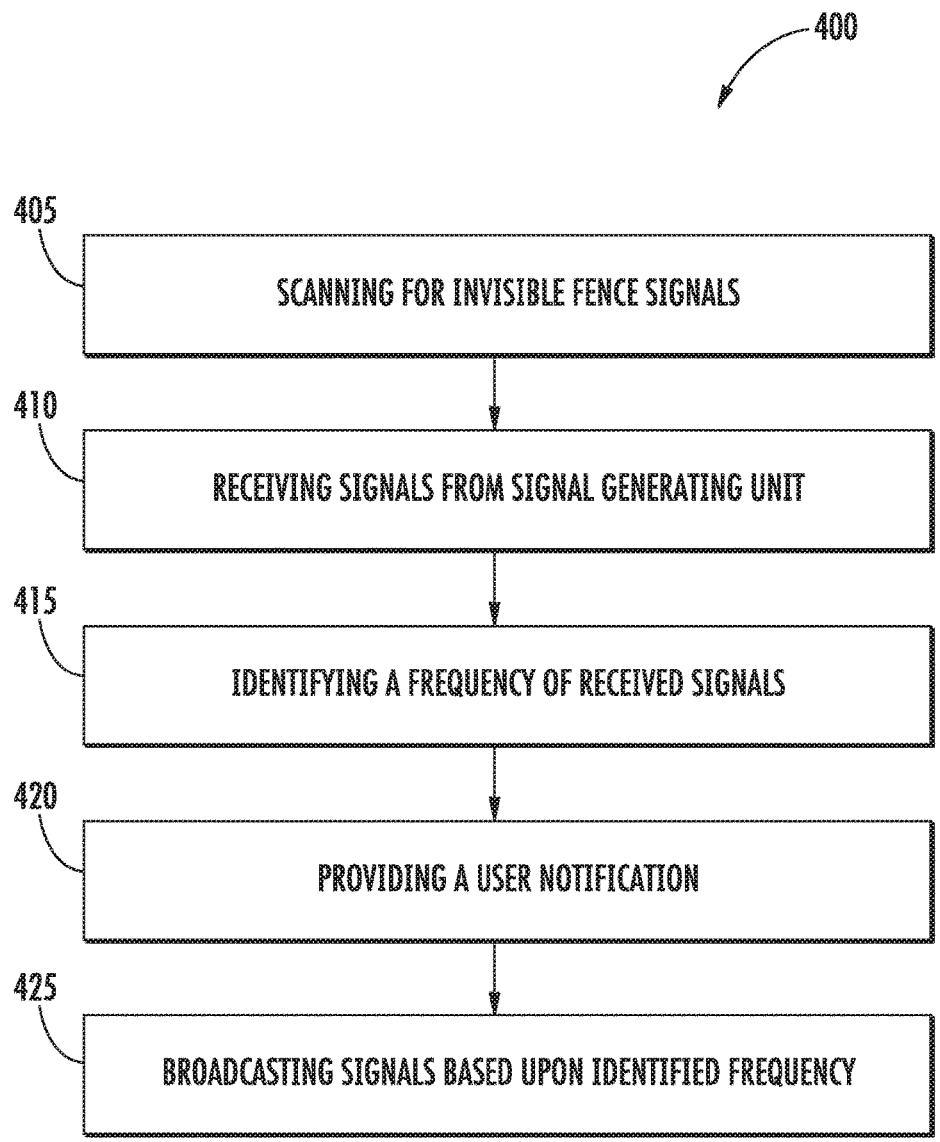
FIG. 4 is a flow chart illustrating a method according to an exemplary embodiment of the invention.

Turning to FIG. 4, a flow chart illustrates an exemplary method 400 of the present invention. At step 405, a mobile communication device (e.g., PDT) scans for invisible fence signals transmitted by a signal generating unit that activate a pet collar unit when the pet collar unit receives the signals.

At step 410 the mobile device receives invisible fence signals (e.g., RF signals) from the signal generating; for example, when a user carrying the mobile device reaches or enters into a zone defining a pet restricted area.

At step 415, the mobile device identifies a frequency of the signals received from the invisible fence system. The identification may include comparing the received signals with a predetermined frequency value or range of values (e.g., low frequency values typical for invisible systems).

At step 420, the mobile device provides a user notification based upon the identification of the invisible fence signals (e.g., an audible, vibratory, or visual notification).

At step 425, the mobile device broadcasts a signal based upon the identified frequency of the invisible fence signals, thereby defining another zone (e.g. a protection zone) for activating the pet collar unit when the pet collar unit receives the broadcasted signal.

EXEMPLARY EMBODIMENTS

An exemplary sample of devices, systems, and methods as described herein are as follows:

A1. A mobile device, comprising:
an indicia-reader for acquiring information from an indicia-bearing medium;
a communication module, the communication module including a signal receiver unit configured to receive a boundary signal from a signal generating unit, wherein the boundary signal establishes a pet boundary area by activating a pet receiver unit;
a processor communicatively coupled to the indicia-reader and the communication module;
a memory communicatively coupled to the processor; and
a housing at least partially enclosing the indicia-reader, the communication module, the processor, and the memory;
wherein the processor is configured to receive the boundary signal from the signal receiver unit, and identify a frequency of the boundary signal.

A2. The mobile device of A1, wherein the memory stores a predetermined frequency range, and wherein the processor is configured to determine if the identified frequency of the boundary signal received from the signal receiver unit is within the predetermined frequency range.

A3. The mobile device of A2, wherein the processor is configured to provide a notification to a user based upon determining that the frequency of the identified signal is within the predetermined frequency range.

A4. The mobile device of A1, wherein the communication module includes a signal emitting unit, and wherein the processor is configured to emit, via the signal emitting unit, a second signal at the identified frequency for activating a pet receiver unit.

A5. The mobile device of A4, comprising a user input device communicatively coupled to the processor and at least partially enclosed by the housing;
wherein the processor is configured to emit the second signal upon receiving an input from the user input device.

A6. The mobile device of A4, wherein the second signal, when emitted from the signal emitting unit, defines a zone surrounding the mobile device based upon a signal transmission range of the signal emitting unit.

A7. The mobile device of A6, wherein the second signal is configured to activate a pet receiver unit to generate a pet-alert comprising at least one of a tone, a vibration, and/or a shock when a pet receiver unit is within the zone.

B1. A method, comprising:
receiving, via a mobile device, a signal from a signal generating unit, wherein the signal establishes a pet boundary area by activating a pet receiver unit;
identifying, via the mobile device, a frequency of the signal received from the signal generating unit;
comparing, via the mobile device, the identified frequency of the signal with a predetermined frequency range;
determining, via the mobile device, that the frequency of the signal is within the predetermined frequency range based upon the results of the comparison; and providing, via the mobile device, a user-notification to a user based upon determining that the identified frequency of the signal is within the predetermined frequency range.

B2. The method of B1, further comprising transmitting, via the mobile device, a second signal at the identified frequency, wherein the second signal is configured for activating a pet receiver unit that receives the second signal.

B3. The method of B2, wherein the transmitting of the second signal is initiated by the mobile device upon receiving a user-input.

B4. The method of B2, wherein the transmitting of the second signal defines a zone surrounding the mobile device based upon a transmission range.

B5. The method of claim B4, further comprising activating, via the transmitting of the second signal, a pet receiver unit in the zone surrounding the mobile device.

B6. The method of B5, wherein the second signal is configured to activate a pet receiver unit to generate a pet-alert comprising at least one of a tone, a vibration, and/or a shock.

C1. A system, comprising:
a signal receiver unit configured to receive a boundary signal from a signal generating unit, wherein the boundary signal establishes a pet boundary area by activating a pet receiver unit;
a signal emitting unit communicatively coupled to the signal receiver unit; and
a computer communicatively coupled to the signal receiver unit and the signal emitting unit, the computer including a processor and a memory storing a predetermined signal frequency range;
wherein the computer's processor is configured to:
receive a boundary signal received by the signal receiver unit;
identify a signal frequency of the boundary signal received from the signal receiver unit;
compare the identified frequency of the boundary signal with the predetermined frequency range; and
determine if the frequency of the boundary signal is within the predetermined frequency range based upon the results of the comparison; and
wherein the computer's processor is configured to initiate a user-notification based upon determining that the identified frequency of the boundary signal is within the predetermined frequency range.

C2. The system of C1, wherein the computer's processor is configured to emit, via the signal emitting unit, a second signal at the identified frequency for activating a pet receiver unit.

C3. The system of C2, wherein the computer's processor is configured to emit the second signal upon determining that the identified frequency of the boundary signal is within the predetermined frequency range.

C4. The system of C2, comprising a user input device communicatively coupled to the processor;

wherein the computer's processor is configured to emit the second signal upon receiving an input from the user input device.

C5. The system of C4, wherein the second signal, when emitted from the signal emitting unit, defines a zone surrounding the signal emitting unit based upon a signal transmission range of the signal emitting unit.

C6. The system of C5, wherein the signal receiver unit is configured to receive a boundary signal from a signal generating unit wherein the boundary signal is transmitted via a cable or a wireless beacon.

C7. The system of C6, wherein the second signal is configured to activate a pet receiver unit to generate a pet-alert comprising at least one of a tone, a vibration, and/or a shock.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. 8,740,082;
U.S. Pat. No. 8,740,085; U.S. Pat. No. 8,746,563;
U.S. Pat. No. 8,750,445; U.S. Pat. No. 8,752,766;
U.S. Pat. No. 8,756,059; U.S. Pat. No. 8,757,495;
U.S. Pat. No. 8,760,563; U.S. Pat. No. 8,763,909;
U.S. Pat. No. 8,777,108; U.S. Pat. No. 8,777,109;
U.S. Pat. No. 8,779,898; U.S. Pat. No. 8,781,520;
U.S. Pat. No. 8,783,573; U.S. Pat. No. 8,789,757;
U.S. Pat. No. 8,789,758; U.S. Pat. No. 8,789,759;
U.S. Pat. No. 8,794,520; U.S. Pat. No. 8,794,522;
U.S. Pat. No. 8,794,525; U.S. Pat. No. 8,794,526;
U.S. Pat. No. 8,798,367; U.S. Pat. No. 8,807,431;
U.S. Pat. No. 8,807,432; U.S. Pat. No. 8,820,630;
U.S. Pat. No. 8,822,848; U.S. Pat. No. 8,824,692;
U.S. Pat. No. 8,824,696; U.S. Pat. No. 8,842,849;
U.S. Pat. No. 8,844,822; U.S. Pat. No. 8,844,823;
U.S. Pat. No. 8,849,019; U.S. Pat. No. 8,851,383;
U.S. Pat. No. 8,854,633; U.S. Pat. No. 8,866,963;
U.S. Pat. No. 8,868,421; U.S. Pat. No. 8,868,519;
U.S. Pat. No. 8,868,802; U.S. Pat. No. 8,868,803;
U.S. Pat. No. 8,870,074; U.S. Pat. No. 8,879,639;
U.S. Pat. No. 8,880,426; U.S. Pat. No. 8,881,983;
U.S. Pat. No. 8,881,987; U.S. Pat. No. 8,903,172;
U.S. Pat. No. 8,908,995; U.S. Pat. No. 8,910,870;
U.S. Pat. No. 8,910,875; U.S. Pat. No. 8,914,290;
U.S. Pat. No. 8,914,788; U.S. Pat. No. 8,915,439;
U.S. Pat. No. 8,915,444; U.S. Pat. No. 8,916,789;
U.S. Pat. No. 8,918,250; U.S. Pat. No. 8,918,564;
U.S. Pat. No. 8,925,818; U.S. Pat. No. 8,939,374;
U.S. Pat. No. 8,942,480; U.S. Pat. No. 8,944,313;
U.S. Pat. No. 8,944,327; U.S. Pat. No. 8,944,332;
U.S. Pat. No. 8,950,678; U.S. Pat. No. 8,967,468;
U.S. Pat. No. 8,971,346; U.S. Pat. No. 8,976,030;
U.S. Pat. No. 8,976,368; U.S. Pat. No. 8,978,981;
U.S. Pat. No. 8,978,983; U.S. Pat. No. 8,978,984;
U.S. Pat. No. 8,985,456; U.S. Pat. No. 8,985,457;
U.S. Pat. No. 8,985,459; U.S. Pat. No. 8,985,461;
U.S. Pat. No. 8,988,578; U.S. Pat. No. 8,988,590;
U.S. Pat. No. 8,991,704; U.S. Pat. No. 8,996,194;
U.S. Pat. No. 8,996,384; U.S. Pat. No. 9,002,641;
U.S. Pat. No. 9,007,368; U.S. Pat. No. 9,010,641;
U.S. Pat. No. 9,015,513; U.S. Pat. No. 9,016,576;
U.S. Pat. No. 9,022,288; U.S. Pat. No. 9,030,964;
U.S. Pat. No. 9,033,240; U.S. Pat. No. 9,033,242;
U.S. Pat. No. 9,036,054; U.S. Pat. No. 9,037,344;
U.S. Pat. No. 9,038,911; U.S. Pat. No. 9,038,915;
U.S. Pat. No. 9,047,098; U.S. Pat. No. 9,047,359;
U.S. Pat. No. 9,047,420; U.S. Pat. No. 9,047,525;
U.S. Pat. No. 9,047,531; U.S. Pat. No. 9,053,055;
U.S. Pat. No. 9,053,378; U.S. Pat. No. 9,053,380;
U.S. Pat. No. 9,058,526; U.S. Pat. No. 9,064,165;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Pat. No. 9,076,459; U.S. Pat. No. 9,079,423;
U.S. Pat. No. 9,080,856; U.S. Pat. No. 9,082,023;
U.S. Pat. No. 9,082,031; U.S. Pat. No. 9,084,032;

U.S. Pat. No. 9,087,250; U.S. Pat. No. 9,092,681;
U.S. Pat. No. 9,092,682; U.S. Pat. No. 9,092,683;
U.S. Pat. No. 9,093,141; U.S. Pat. No. 9,098,763;
U.S. Pat. No. 9,104,929; U.S. Pat. No. 9,104,934;
U.S. Pat. No. 9,107,484; U.S. Pat. No. 9,111,159;
U.S. Pat. No. 9,111,166; U.S. Pat. No. 9,135,483;
U.S. Pat. No. 9,137,009; U.S. Pat. No. 9,141,839;
U.S. Pat. No. 9,147,096; U.S. Pat. No. 9,148,474;
U.S. Pat. No. 9,158,000; U.S. Pat. No. 9,158,340;
U.S. Pat. No. 9,158,953; U.S. Pat. No. 9,159,059;
U.S. Pat. No. 9,165,174; U.S. Pat. No. 9,171,543;
U.S. Pat. No. 9,183,425; U.S. Pat. No. 9,189,669;
U.S. Pat. No. 9,195,844; U.S. Pat. No. 9,202,458;
U.S. Pat. No. 9,208,366; U.S. Pat. No. 9,208,367;
U.S. Pat. No. 9,219,836; U.S. Pat. No. 9,224,024;
U.S. Pat. No. 9,224,027; U.S. Pat. No. 9,230,140;
U.S. Pat. No. 9,235,553; U.S. Pat. No. 9,239,950;
U.S. Pat. No. 9,245,492; U.S. Pat. No. 9,248,640;
U.S. Pat. No. 9,250,652; U.S. Pat. No. 9,250,712;
U.S. Pat. No. 9,251,411; U.S. Pat. No. 9,258,033;
U.S. Pat. No. 9,262,633; U.S. Pat. No. 9,262,660;
U.S. Pat. No. 9,262,662; U.S. Pat. No. 9,269,036;
U.S. Pat. No. 9,270,782; U.S. Pat. No. 9,274,812;
U.S. Pat. No. 9,275,388; U.S. Pat. No. 9,277,668;
U.S. Pat. No. 9,280,693; U.S. Pat. No. 9,286,496;
U.S. Pat. No. 9,298,964; U.S. Pat. No. 9,301,427;
U.S. Pat. No. 9,313,377; U.S. Pat. No. 9,317,037;
U.S. Pat. No. 9,319,548; U.S. Pat. No. 9,342,723;
U.S. Pat. No. 9,361,882; U.S. Pat. No. 9,365,381;
U.S. Pat. No. 9,373,018; U.S. Pat. No. 9,375,945;
U.S. Pat. No. 9,378,403; U.S. Pat. No. 9,383,848;
U.S. Pat. No. 9,384,374; U.S. Pat. No. 9,390,304;
U.S. Pat. No. 9,390,596; U.S. Pat. No. 9,411,386;
U.S. Pat. No. 9,412,242; U.S. Pat. No. 9,418,269;
U.S. Pat. No. 9,418,270; U.S. Pat. No. 9,465,967;
U.S. Pat. No. 9,423,318; U.S. Pat. No. 9,424,454;
U.S. Pat. No. 9,436,860; U.S. Pat. No. 9,443,123;
U.S. Pat. No. 9,443,222; U.S. Pat. No. 9,454,689;
U.S. Pat. No. 9,464,885; U.S. Pat. No. 9,465,967;
U.S. Pat. No. 9,478,983; U.S. Pat. No. 9,481,186;
U.S. Pat. No. 9,487,113; U.S. Pat. No. 9,488,986;
U.S. Pat. No. 9,489,782; U.S. Pat. No. 9,490,540;
U.S. Pat. No. 9,491,729; U.S. Pat. No. 9,497,092;
U.S. Pat. No. 9,507,974; U.S. Pat. No. 9,519,814;
U.S. Pat. No. 9,521,331; U.S. Pat. No. 9,530,038;
U.S. Pat. No. 9,572,901; U.S. Pat. No. 9,558,386;
U.S. Pat. No. 9,606,581; U.S. Pat. No. 9,646,189;
U.S. Pat. No. 9,646,191; U.S. Pat. No. 9,652,648;
U.S. Pat. No. 9,652,653; U.S. Pat. No. 9,656,487;
U.S. Pat. No. 9,659,198; U.S. Pat. No. 9,680,282;
U.S. Pat. No. 9,697,401; U.S. Pat. No. 9,701,140;
U.S. Design Pat. No. D702,237;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D734,339;
U.S. Design Pat. No. D737,321;
U.S. Design Pat. No. D754,205;
U.S. Design Pat. No. D754,206;
U.S. Design Pat. No. D757,009;
U.S. Design Pat. No. D760,719;
U.S. Design Pat. No. D762,604;
U.S. Design Pat. No. D766,244;
U.S. Design Pat. No. D777,166;
U.S. Design Pat. No. D771,631;
U.S. Design Pat. No. D783,601;
U.S. Design Pat. No. D785,617;
U.S. Design Pat. No. D785,636;
U.S. Design Pat. No. D790,505;
U.S. Design Pat. No. D790,546;
International Publication No. 2013/163789;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0194692;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0332996;
U.S. Patent Application Publication No. 2014/0001267;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0125853;

U.S. Patent Application Publication No. 2014/0125999;
U.S. Patent Application Publication No. 2014/0129378;
U.S. Patent Application Publication No. 2014/0131443;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0191684;
U.S. Patent Application Publication No. 2014/0191913;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0231500;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0332590;
U.S. Patent Application Publication No. 2014/0351317;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0009338;
U.S. Patent Application Publication No. 2015/0014416;
U.S. Patent Application Publication No. 2015/0021397;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0049347;
U.S. Patent Application Publication No. 2015/0051992;
U.S. Patent Application Publication No. 2015/0053769;
U.S. Patent Application Publication No. 2015/0062366;
U.S. Patent Application Publication No. 2015/0063215;
U.S. Patent Application Publication No. 2015/0088522;
U.S. Patent Application Publication No. 2015/0096872;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0149946;
U.S. Patent Application Publication No. 2015/0161429;
U.S. Patent Application Publication No. 2015/0178523;
U.S. Patent Application Publication No. 2015/0178537;
U.S. Patent Application Publication No. 2015/0178685;
U.S. Patent Application Publication No. 2015/0181109;
U.S. Patent Application Publication No. 2015/0199957;
U.S. Patent Application Publication No. 2015/0210199;
U.S. Patent Application Publication No. 2015/0212565;
U.S. Patent Application Publication No. 2015/0213647;
U.S. Patent Application Publication No. 2015/0220753;
U.S. Patent Application Publication No. 2015/0220901;
U.S. Patent Application Publication No. 2015/0227189;
U.S. Patent Application Publication No. 2015/0236984;
U.S. Patent Application Publication No. 2015/0239348;
U.S. Patent Application Publication No. 2015/0242658;
U.S. Patent Application Publication No. 2015/0248572;
U.S. Patent Application Publication No. 2015/0254485;
U.S. Patent Application Publication No. 2015/0261643;
U.S. Patent Application Publication No. 2015/0264624;
U.S. Patent Application Publication No. 2015/0268971;
U.S. Patent Application Publication No. 2015/0269402;
U.S. Patent Application Publication No. 2015/0288689;
U.S. Patent Application Publication No. 2015/0288896;
U.S. Patent Application Publication No. 2015/0310243;
U.S. Patent Application Publication No. 2015/0310244;
U.S. Patent Application Publication No. 2015/0310389;
U.S. Patent Application Publication No. 2015/0312780;
U.S. Patent Application Publication No. 2015/0327012;
U.S. Patent Application Publication No. 2016/0014251;
U.S. Patent Application Publication No. 2016/0025697;
U.S. Patent Application Publication No. 2016/0026838;
U.S. Patent Application Publication No. 2016/0026839;
U.S. Patent Application Publication No. 2016/0040982;
U.S. Patent Application Publication No. 2016/0042241;
U.S. Patent Application Publication No. 2016/0057230;
U.S. Patent Application Publication No. 2016/0062473;
U.S. Patent Application Publication No. 2016/0070944;
U.S. Patent Application Publication No. 2016/0092805;
U.S. Patent Application Publication No. 2016/0101936;
U.S. Patent Application Publication No. 2016/0104019;
U.S. Patent Application Publication No. 2016/0104274;
U.S. Patent Application Publication No. 2016/0109219;
U.S. Patent Application Publication No. 2016/0109220;
U.S. Patent Application Publication No. 2016/0109224;
U.S. Patent Application Publication No. 2016/0112631;
U.S. Patent Application Publication No. 2016/0112643;
U.S. Patent Application Publication No. 2016/0117627;
U.S. Patent Application Publication No. 2016/0124516;
U.S. Patent Application Publication No. 2016/0125217;
U.S. Patent Application Publication No. 2016/0125342;
U.S. Patent Application Publication No. 2016/0125873;
U.S. Patent Application Publication No. 2016/0133253;
U.S. Patent Application Publication No. 2016/0171597;
U.S. Patent Application Publication No. 2016/0171666;
U.S. Patent Application Publication No. 2016/0171720;
U.S. Patent Application Publication No. 2016/0171775;
U.S. Patent Application Publication No. 2016/0171777;
U.S. Patent Application Publication No. 2016/0174674;
U.S. Patent Application Publication No. 2016/0178479;
U.S. Patent Application Publication No. 2016/0178685;
U.S. Patent Application Publication No. 2016/0178707;
U.S. Patent Application Publication No. 2016/0179132;
U.S. Patent Application Publication No. 2016/0179143;
U.S. Patent Application Publication No. 2016/0179368;
U.S. Patent Application Publication No. 2016/0179378;
U.S. Patent Application Publication No. 2016/0180130;
U.S. Patent Application Publication No. 2016/0180133;
U.S. Patent Application Publication No. 2016/0180136;
U.S. Patent Application Publication No. 2016/0180594;
U.S. Patent Application Publication No. 2016/0180663;

U.S. Patent Application Publication No. 2016/0180678;
U.S. Patent Application Publication No. 2016/0180713;
U.S. Patent Application Publication No. 2016/0185136;
U.S. Patent Application Publication No. 2016/0185291;
U.S. Patent Application Publication No. 2016/0186926;
U.S. Patent Application Publication No. 2016/0188861;
U.S. Patent Application Publication No. 2016/0188939;
U.S. Patent Application Publication No. 2016/0188940;
U.S. Patent Application Publication No. 2016/0188941;
U.S. Patent Application Publication No. 2016/0188942;
U.S. Patent Application Publication No. 2016/0188943;
U.S. Patent Application Publication No. 2016/0188944;
U.S. Patent Application Publication No. 2016/0189076;
U.S. Patent Application Publication No. 2016/0189087;
U.S. Patent Application Publication No. 2016/0189088;
U.S. Patent Application Publication No. 2016/0189092;
U.S. Patent Application Publication No. 2016/0189284;
U.S. Patent Application Publication No. 2016/0189288;
U.S. Patent Application Publication No. 2016/0189366;
U.S. Patent Application Publication No. 2016/0189443;
U.S. Patent Application Publication No. 2016/0189447;
U.S. Patent Application Publication No. 2016/0189489;
U.S. Patent Application Publication No. 2016/0192051;
U.S. Patent Application Publication No. 2016/0202951;
U.S. Patent Application Publication No. 2016/0202958;
U.S. Patent Application Publication No. 2016/0202959;
U.S. Patent Application Publication No. 2016/0203021;
U.S. Patent Application Publication No. 2016/0203429;
U.S. Patent Application Publication No. 2016/0203797;
U.S. Patent Application Publication No. 2016/0203820;
U.S. Patent Application Publication No. 2016/0204623;
U.S. Patent Application Publication No. 2016/0204636;
U.S. Patent Application Publication No. 2016/0204638;
U.S. Patent Application Publication No. 2016/0227912;
U.S. Patent Application Publication No. 2016/0232891;
U.S. Patent Application Publication No. 2016/0292477;
U.S. Patent Application Publication No. 2016/0294779;
U.S. Patent Application Publication No. 2016/0306769;
U.S. Patent Application Publication No. 2016/0314276;
U.S. Patent Application Publication No. 2016/0314294;
U.S. Patent Application Publication No. 2016/0316190;
U.S. Patent Application Publication No. 2016/0323310;
U.S. Patent Application Publication No. 2016/0325677;
U.S. Patent Application Publication No. 2016/0327614;
U.S. Patent Application Publication No. 2016/0327930;
U.S. Patent Application Publication No. 2016/0328762;
U.S. Patent Application Publication No. 2016/0330218;
U.S. Patent Application Publication No. 2016/0343163;
U.S. Patent Application Publication No. 2016/0343176;
U.S. Patent Application Publication No. 2016/0364914;
U.S. Patent Application Publication No. 2016/0370220;
U.S. Patent Application Publication No. 2016/0372282;
U.S. Patent Application Publication No. 2016/0373847;
U.S. Patent Application Publication No. 2016/0377414;
U.S. Patent Application Publication No. 2016/0377417;
U.S. Patent Application Publication No. 2017/0010141;
U.S. Patent Application Publication No. 2017/0010328;
U.S. Patent Application Publication No. 2017/0010780;
U.S. Patent Application Publication No. 2017/0016714;
U.S. Patent Application Publication No. 2017/0018094;
U.S. Patent Application Publication No. 2017/0046603;
U.S. Patent Application Publication No. 2017/0047864;
U.S. Patent Application Publication No. 2017/0053146;
U.S. Patent Application Publication No. 2017/0053147;
U.S. Patent Application Publication No. 2017/0053647;
U.S. Patent Application Publication No. 2017/0055606;
U.S. Patent Application Publication No. 2017/0060316;
U.S. Patent Application Publication No. 2017/0061961;
U.S. Patent Application Publication No. 2017/0064634;
U.S. Patent Application Publication No. 2017/0083730;
U.S. Patent Application Publication No. 2017/0091502;
U.S. Patent Application Publication No. 2017/0091706;
U.S. Patent Application Publication No. 2017/0091741;
U.S. Patent Application Publication No. 2017/0091904;
U.S. Patent Application Publication No. 2017/0092908;
U.S. Patent Application Publication No. 2017/0094238;
U.S. Patent Application Publication No. 2017/0098947;
U.S. Patent Application Publication No. 2017/0100949;
U.S. Patent Application Publication No. 2017/0108838;
U.S. Patent Application Publication No. 2017/0108895;
U.S. Patent Application Publication No. 2017/0118355;
U.S. Patent Application Publication No. 2017/0123598;
U.S. Patent Application Publication No. 2017/0124369;
U.S. Patent Application Publication No. 2017/0124396;
U.S. Patent Application Publication No. 2017/0124687;
U.S. Patent Application Publication No. 2017/0126873;
U.S. Patent Application Publication No. 2017/0126904;
U.S. Patent Application Publication No. 2017/0139012;
U.S. Patent Application Publication No. 2017/0140329;
U.S. Patent Application Publication No. 2017/0140731;
U.S. Patent Application Publication No. 2017/0147847;
U.S. Patent Application Publication No. 2017/0150124;
U.S. Patent Application Publication No. 2017/0169198;
U.S. Patent Application Publication No. 2017/0171035;
U.S. Patent Application Publication No. 2017/0171703;
U.S. Patent Application Publication No. 2017/0171803;
U.S. Patent Application Publication No. 2017/0180359;
U.S. Patent Application Publication No. 2017/0180577;
U.S. Patent Application Publication No. 2017/0181299;
U.S. Patent Application Publication No. 2017/0190192;
U.S. Patent Application Publication No. 2017/0193432;
U.S. Patent Application Publication No. 2017/0193461;
U.S. Patent Application Publication No. 2017/0193727;
U.S. Patent Application Publication No. 2017/0199266;
U.S. Patent Application Publication No. 2017/0200108; and
U.S. Patent Application Publication No. 2017/0200275.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method comprising:
   receiving, by a mobile communication device, a plurality of radio frequency signals from a signal generating unit in a first radio frequency zone within a pet restricted area, wherein the radio frequency signals activates a pet collar unit when the pet collar unit receives the radio frequency signals;
   identifying, by the mobile communication device, a frequency of the radio frequency signals; and
   broadcasting, by the mobile communication device, a radio frequency signal at the identified frequency, defining a second radio frequency zone based on a signal range of the mobile communication device, so that the broadcasted radio frequency signal activates the pet collar unit when the pet collar unit receives the broadcasted radio frequency signal.

2. The method as claimed in claim 1, wherein the mobile communication device broadcasts the radio frequency signals at the identified frequency based on the pet collar unit entering the second radio frequency zone.

3. The method as claimed in claim 1, wherein the identifying comprises comparing the frequency of the received radio frequency signals with a pre-determined frequency value.

4. The method as claimed in claim 1, further comprising providing, by the mobile communication device, a notification to a user upon determining the radio frequency signal to be within a pre-determined range of frequency values.

5. The method as claimed in claim 1, wherein the broadcasting comprises receiving an input on the mobile communication device for initiating the broadcast of the identified radio frequency signal in the second radio frequency zone.

6. The method as claimed in claim 1, further comprising generating at least one of a warning tone, mild shock, and a vibration on the pet collar unit upon the pet collar unit receiving of the broadcasted radio frequency signal.

7. A method comprising:
receiving, by a mobile communication device, a plurality of radio frequency signals from a signal generating unit within a pet restricted area, wherein the radio frequency signals from the signal generating unit activate a pet collar unit when the pet collar unit receives the radio frequency signals;
identifying, by the mobile communication device, a frequency of the radio frequency signals to be within a pre-determined range of frequency values; and
broadcasting, by the mobile communication device, radio frequency signals within the pre-determined range of frequency values, wherein the broadcasted radio frequency signals activate the pet collar unit when the pet collar unit receives the broadcasted radio frequency signals from the mobile communication device.

8. The method as claimed in claim 7, wherein the mobile communication device broadcasts the radio frequency signals based on at least one of the following conditions: (i) when a distance between the pet collar unit and the signal generating unit is greater than a distance between the pet collar unit and the mobile communication device, and/or (ii) when the pet collar unit enters a second radio frequency zone, wherein the second radio frequency zone corresponds to an area within a radio frequency broadcast range of the mobile communication device.

9. The method as claimed in claim 7, wherein the identifying comprises comparing the frequency of the received radio frequency signals with a pre-determined frequency value.

10. The method as claimed in claim 7, further comprising providing, by the mobile communication device, a notification to a user upon determining the identified radio frequency signals to be within the pre-determined range of frequency values.

11. The method as claimed in claim 7, wherein the broadcasting comprises receiving an input on the mobile communication device for initiating the broadcast.

12. The method as claimed in claim 7, further comprising generating at least one of a warning tone, mild shock, and/or a vibration on the pet collar unit upon the pet collar unit receiving the broadcasted radio frequency signals.

13. A system comprising:
a signal emitting unit configured to generate radio frequency signals at a first radio frequency zone within a pet-restricted area;
a mobile communication device communicatively coupled to the signal emitting unit, the mobile communication device comprising:
a processing unit;
a first trans-receiving unit coupled to the processing unit, the first trans-receiving unit configured to:
receive the radio frequency signals generated by the signal emitting unit;
identify the radio frequency signals to be within a pre-determined range of frequency values and at a pre-determined signal strength; and
broadcast radio frequency signals within the predetermined range of frequency values in a second radio frequency zone, wherein the second radio frequency zone is based upon the pre-determined signal strength and corresponds to an area within a radio frequency broadcast range of the mobile communication device; and
a portable device communicatively coupled to at least one of the signal emitting unit and the mobile communication device, the portable device comprising:
a second trans-receiving unit configured to receive radio frequency signals broadcast by the first trans-receiving unit when at least one of the following conditions occurs:
(i) when distance between the portable device and the signal emitting unit is greater than the distance between the portable device and the mobile communication device; and/or
(ii) when the portable device enters the second radio frequency zone.

14. The system as claimed in claim 13, wherein the portable device is a pet collar unit wearable by a pet, and the signal emitting unit is a radio frequency broadcasting beacon.

15. The system as claimed in claim 13, wherein the processing unit is configured to generate a notification on the mobile communication device upon the determining the radio frequency signal to be within the predetermined range of frequency values and at the pre-determined signal strength.

16. The system as claimed in claim 13, wherein the processing unit is configured to generate an alert on the mobile communication device based on determining presence of a pet within a pet-restricted area depending upon receiving of the radio frequency signal on the second trans-receiving unit.

17. The system as claimed in claim 13, wherein the mobile communication device is configured to receive an input from a user to initiate the broadcast of the identified radio frequency signals.

18. The system as claimed in claim 13, wherein the portable device is configured to generate at least one of a warning tone, mild shock, and/or a vibration based on receiving the broadcasted radio frequency signals on the second trans-receiving unit.

* * * * *